(12) United States Patent
Yoon et al.

(10) Patent No.: US 8,023,090 B2
(45) Date of Patent: Sep. 20, 2011

(54) LIQUID CRYSTAL DISPLAY DEVICE AND METHOD OF MANUFACTURING THE SAME

(75) Inventors: Jin-Mo Yoon, Gyeonggi-do (KR); In-Yeong Kong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 372 days.

(21) Appl. No.: 12/318,297

(22) Filed: Dec. 24, 2008

(65) Prior Publication Data

US 2009/0296038 A1 Dec. 3, 2009

(30) Foreign Application Priority Data

Jun. 2, 2008 (KR) ........................ 10-2008-0051644

(51) Int. Cl.
*G02F 1/1345* (2006.01)
*G02F 1/1339* (2006.01)
(52) U.S. Cl. .......................... 349/152; 349/149; 349/153
(58) Field of Classification Search ........................ None
See application file for complete search history.

(56) References Cited

U.S. PATENT DOCUMENTS

| | | | | |
|---|---|---|---|---|
| 7,352,426 B2* | 4/2008 | Abe et al. | ...................... | 349/149 |
| 7,583,350 B2* | 9/2009 | Chang et al. | .................. | 349/153 |
| 2007/0120152 A1* | 5/2007 | Chang et al. | .................. | 257/270 |
| 2007/0296674 A1 | 12/2007 | Aoki et al. | | |
| 2008/0137021 A1* | 6/2008 | Choi et al. | ...................... | 349/150 |
| 2009/0290085 A1* | 11/2009 | Chang et al. | .................... | 349/54 |
| 2010/0002180 A1* | 1/2010 | Kim et al. | ...................... | 349/143 |

* cited by examiner

*Primary Examiner* — Rhonda Peace
(74) *Attorney, Agent, or Firm* — Morgan, Lewis & Bockius LLP

(57) ABSTRACT

A gate-in-panel type liquid crystal display device includes first and second substrates spaced apart from and facing each other, the first and second substrates including a display area and a non-display area; gate lines, data lines, thin film transistors and pixel electrodes in the display area on the first substrate, the gate lines and the data lines crossing each other to define pixel regions, the thin film transistors connected to the gate lines and the data lines, the pixel electrodes connected to the thin film transistors; gate pads and data pads in the non-display area on the first substrate, the gate pads and the data pads receiving direct current (DC) signals and alternating current (AC) signals; gate link lines connected to the gate pads and including first gate link lines and second gate link lines, the first gate link lines transmitting the DC signals and disposed to be adjacent to and parallel to each other, the second gate link lines transmitting the AC signals and disposed to be adjacent to and parallel to each other; connection lines connected to the gate link lines; gate circuit blocks connected to the connection lines, the gate circuit blocks generating gate signals using the DC signals and the AC signals and providing the gate signals to the gate lines; and a seal pattern between the first and second substrates and overlapping the gate link lines.

14 Claims, 6 Drawing Sheets

LIQUID CRYSTAL DISPLAY DEVICE AND METHOD OF MANUFACTURING THE SAME

This application claims the benefit of Korean Patent Application No. 10-2008-0051644, filed in Korea on Jun. 2, 2008, which is hereby incorporated by reference for all purposes as if fully set forth herein.

BACKGROUND OF THE INVENTION

1. Field of the Invention

The present invention relates to a liquid crystal display (LCD) device, and more particularly, to a gate-in-panel (GIP) type liquid crystal display (LCD) device and a method of manufacturing the same.

2. Discussion of the Related Art

With the rapid development in information technology, flat panel display (FPD) devices, which have the properties of a thin profile, low weight and low power consumption, have been developed. Among the FPD devices, liquid crystal display (LCD) devices are widely used for notebook computers and desktop monitors because of their excellent characteristics of resolution, color display and display quality.

In general, a liquid crystal display (LCD) device includes two substrates, which are spaced apart and face each other, and a liquid crystal layer interposed between the two substrates. Each of the substrates includes an electrode, and the electrodes of each substrate also face each other. A voltage is applied to each electrode, and an electric field is induced between the electrodes. Liquid crystal molecules of the liquid crystal layer are rearranged by varying the intensity of the electric field, and the transmittance of light is changed according to the arrangement of the liquid crystal molecules, thereby displaying images.

The LCD device includes a liquid crystal panel including two substrate and a liquid crystal layer interposed therebetween, a backlight unit disposed under the liquid crystal panel and functioning as a light source, and a driving circuit unit disposed at an outer portion of the liquid crystal panel and driving the liquid crystal panel.

Generally, the driving circuit unit includes a printed circuit board (PCB). The driving circuit unit is classified into a gate driving circuit unit, which is connected to gate lines of the liquid crystal panel and provides gate signals to the gate lines, and a data driving circuit unit, which is connected to data lines of the liquid crystal panel and provides data signals to the data lines. The driving circuit unit may be attached to one side or two sides of the liquid crystal panel by a tape carrier package (TCP) method.

However, the size and weight of the LCD device increases if the gate driving circuit unit and the data driving circuit unit are separately attached. Accordingly, a gate-in-panel (GIP) type LCD device has been suggested, in which some circuits of the gate driving circuit unit are formed simultaneously with switching elements of the liquid crystal panel, and the other circuits of the gate driving circuit unit are combined into the data driving circuit unit and attached to a side of the liquid crystal panel.

FIG. 1 is a plan view of a GIP type LCD device according to the related art. In FIG. 1, the GIP type LCD device 10 includes a first substrate 20, a second substrate 50 over the first substrate 10, and a liquid crystal layer (not shown) interposed between the substrates 20 and 50. The first substrate 20, which may be referred to as an array substrate, includes a display area DA for displaying images and a non-display area NDA for driving circuits and signal lines.

In the display area DA of the first substrate 20, gate lines 22, data lines 24, thin film transistors Tr and pixel electrodes 45 are formed. The gate lines 22 and the data lines 24 cross each other to define pixel regions P. The thin film transistors Tr are connected to the gate lines 22 and the data lines 24, and the pixel electrodes 45 are connected to the thin film transistors Tr, respectively.

In the non-display area NDA of the first substrate 20, gate pads 42, data pads 44, gate circuit blocks 30, gate link lines 46, data link lines 48 and connection lines 32 are formed. The data pads 44 are formed at one ends of the data link lines 48, which extend from the data lines 24 in the display area DA, and are connected to a driving circuit unit (not shown) of the outside. The gate pads 42 are formed at one ends of the gate link lines 46 and are connected to the driving circuit unit (not shown) of the outside. The gate link lines 46 are connected to the connection lines 32 through connection patterns 34. The connection lines 32 are connected to the gate circuit blocks 30, and the gate circuit blocks 30 are connected to one ends of the gate lines 22 in the display area DA.

In the LCD device 10, the driving circuit unit of the outside provides gate control signals and data signals to the gate pads 42 and the data pads 44. The gate control signals include a start signal VST, clock signals CLK1, CLK2, CLK3 and CLK4, a source voltage signal VDD, a ground voltage signal VSS, a first source voltage signal VDD1, a second source voltage signal VDD2, and a reset signal RESET. The data signals include image signals corresponding to the pixel regions P.

The gate circuit blocks 30 include shift registers. The gate circuit blocks 30 receive the gate control signals through the connection lines 32 from the driving circuit unit. The gate circuit blocks 30 generate gate signals, which turn on the thin film transistors Tr, in order and provide the gate signals to the gate lines 22.

The first and second substrates 20 and 50 are attached using a seal pattern 80. The seal pattern 80 is formed in an edge portion of the non-display area NDA. That is, the seal pattern 80 corresponds to an edge portion of the second substrate 50 and is formed in an outer portion of the gate link lines 46 right and left and in an outer portion of the display area DA up and down in the context of the figure.

A width W of the seal pattern 80 is about 1.2 mm, and a distance from the seal pattern 80 to the gate circuit blocks 30 is about 2 mm. Since an area for the seal pattern 80 is not used to display the images and is not an area for circuits, the area for the seal pattern 80 is blocked by a frame after manufacturing the LCD device. The area may be referred to as a bezel. The bezel increases the non-display area of the LCD device and thus decreases the display area of the LCD device.

If the seal pattern 80 is formed over a portion where the gate link lines 46 and the connection lines 32 are connected to each other, the gate link lines 46 and the connection lines 32 may form a parasitic capacitor with the seal pattern 80 as a dielectric material, and this may cause delay of gate signals transmitted by the gate link lines 46 and the connection lines 32.

FIG. 2 is a view of delay of gate signals of a GIP type LCD device according to the related art, and FIG. 3 is a view showing misoperation of a gate signal of a GIP type LCD device according to the related art. Here, the seal pattern 80 of FIG. 1 is formed over the gate link lines 46 of FIG. 1 transmitting clock signals. Referring to FIG. 2, in the GIP type LCD device according to the related art, the clock signals are distorted by resistance-capacitance delay due to a parasitic capacitance, and the gate circuit blocks 30 of FIG. 1 generate gate signals from the distorted clock signals. Accordingly, rising time and falling time of normal gate signals G1 are delayed, and distorted gate signals G2 are provided to the gate lines 22 of FIG. 1 to deteriorate image qualities.

Additionally, in FIG. 3, the gate circuit blocks 30 of FIG. 1 generate the gate signal using the distorted clock signals, and there may be misoperation that a gate high voltage is not normally generated. The gate control signals transmitted by the gate link lines 46 of FIG. 1 include direct current (DC) signals and alternating current (AC) signals, and the signals have different shapes in voltage values and periods. The gate control signals having various shapes cause different delay results even if the parasitic capacitances are the same. In addition, there are variations of signal distortions due to the parasitic capacitances according to positions of the gate link lines 46. As a result, misoperation may occur when the gate high voltage is generated.

Therefore, in the GIP type LCD device according to the related art, the seal pattern is formed at the outer portion of the gate link lines. Since the seal pattern area, which is not needed to display images, is added, an external grade of the LCD device is lowered, and the display area is decreased.

SUMMARY OF THE INVENTION

Accordingly, the present invention is directed to a liquid crystal display device and a method of manufacturing the same that substantially obviate one or more of the problems due to limitations and disadvantages of the related art.

To achieve the advantages and in accordance with the purpose of embodiments of the invention, a gate-in-panel type liquid crystal display device includes first and second substrates spaced apart from and facing each other, the first and second substrates including a display area and a non-display area; gate lines, data lines, thin film transistors and pixel electrodes in the display area on the first substrate, the gate lines and the data lines crossing each other to define pixel regions, the thin film transistors connected to the gate lines and the data lines, the pixel electrodes connected to the thin film transistors; gate pads and data pads in the non-display area on the first substrate, the gate pads and the data pads receiving direct current (DC) signals and alternating current (AC) signals; gate link lines connected to the gate pads and including first gate link lines and second gate link lines, the first gate link lines transmitting the DC signals and disposed to be adjacent to and parallel to each other, the second gate link lines transmitting the AC signals and disposed to be adjacent to and parallel to each other; connection lines connected to the gate link lines; gate circuit blocks connected to the connection lines, the gate circuit blocks generating gate signals using the DC signals and the AC signals and providing the gate signals to the gate lines; and a seal pattern between the first and second substrates and overlapping the gate link lines.

In another aspect, a method of manufacturing a gate-in-panel type liquid crystal display device includes forming gate lines, data lines, thin film transistors and pixel electrodes in a display area on a first substrate, the gate lines and the data lines crossing each other to pixel regions, the thin film transistors connected to the gate lines and the data lines, the pixel electrodes connected to the thin film transistors; forming gate pads and data pads in a non-display area on the first substrate, the gate pads and the data pads receiving direct current (DC) signals and alternating current (AC) signals; forming gate link lines in the non-display area on the first substrate, the gate link lines connected to the gate pads and including first gate link lines and second gate link lines, the first gate link lines transmitting the DC signals and disposed to be adjacent to and parallel to each other, the second gate link lines transmitting the AC signals and disposed to be adjacent to and parallel to each other; forming connection lines connected to the gate link lines; forming gate circuit blocks connected to the connection lines, the gate circuit blocks generating gate signals using the DC signals and the AC signals and providing the gate signals to the gate lines; and attaching the first substrate with a second substrate using a seal pattern such that the seal pattern overlaps the gate link lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
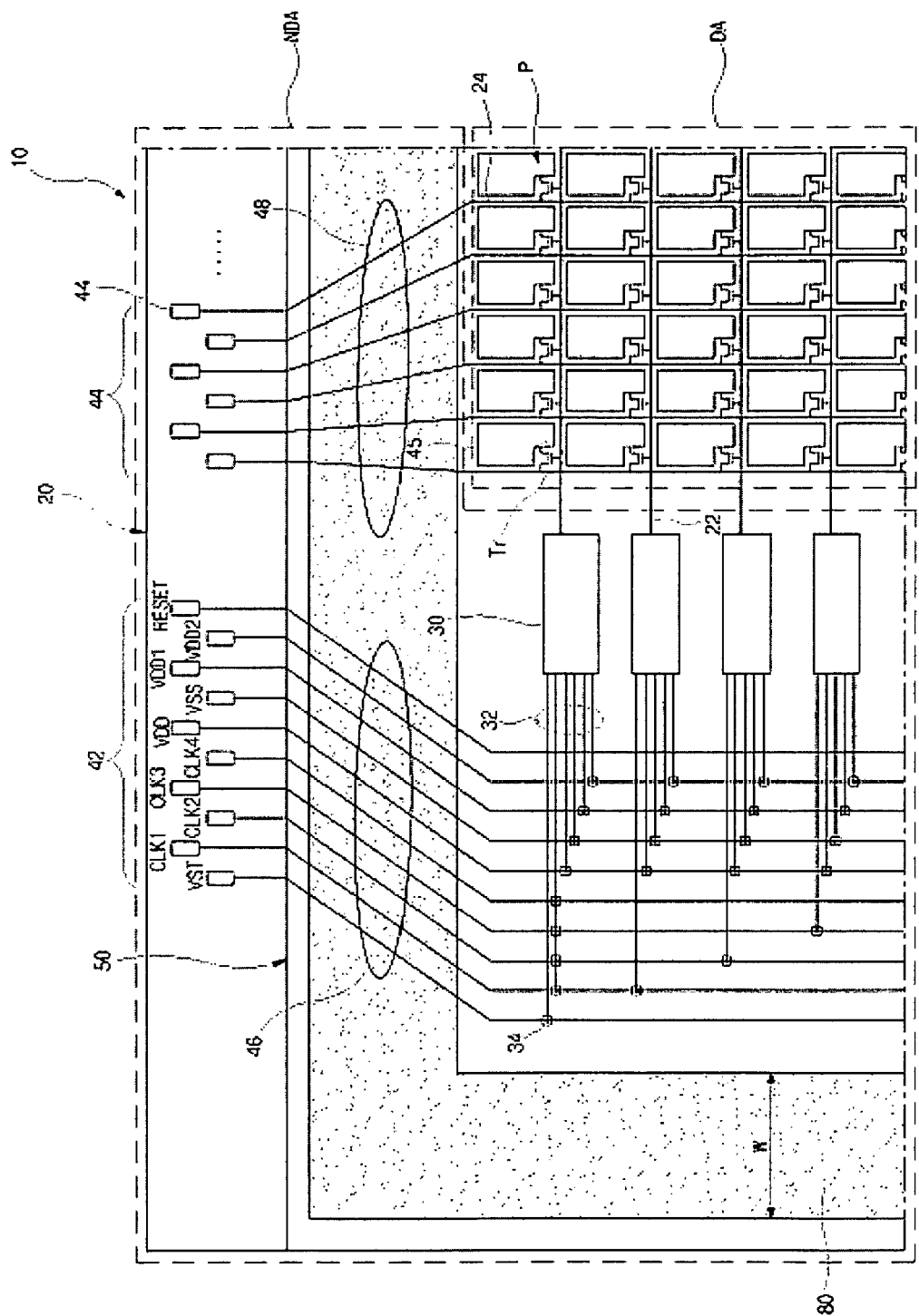
FIG. 1 is a plan view of a GIP type LCD device according to the related art.
Figure 2:
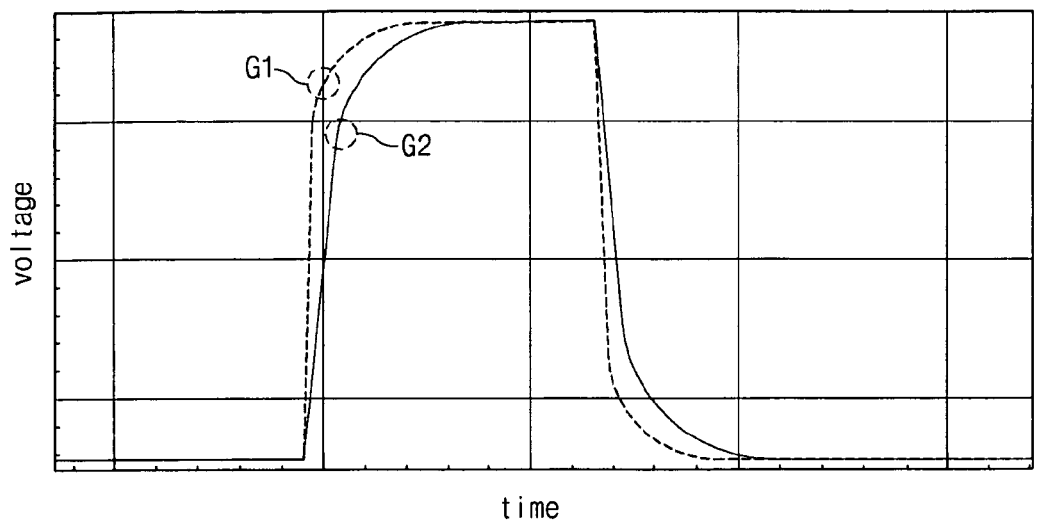
FIG. 2 is a view showing delay of gate signals of a GIP type LCD device according to the related art.
Figure 3:
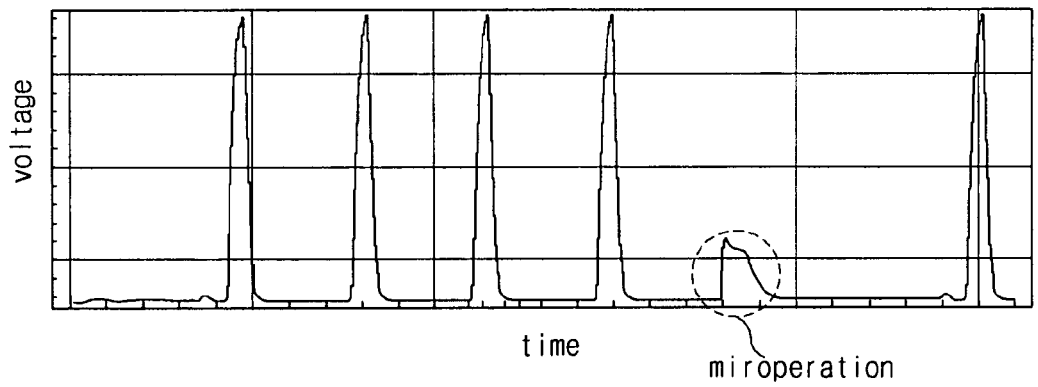
FIG. 3 is a view showing misoperation of a gate signal of a GIP type LCD device according to the related art.
Figure 4:
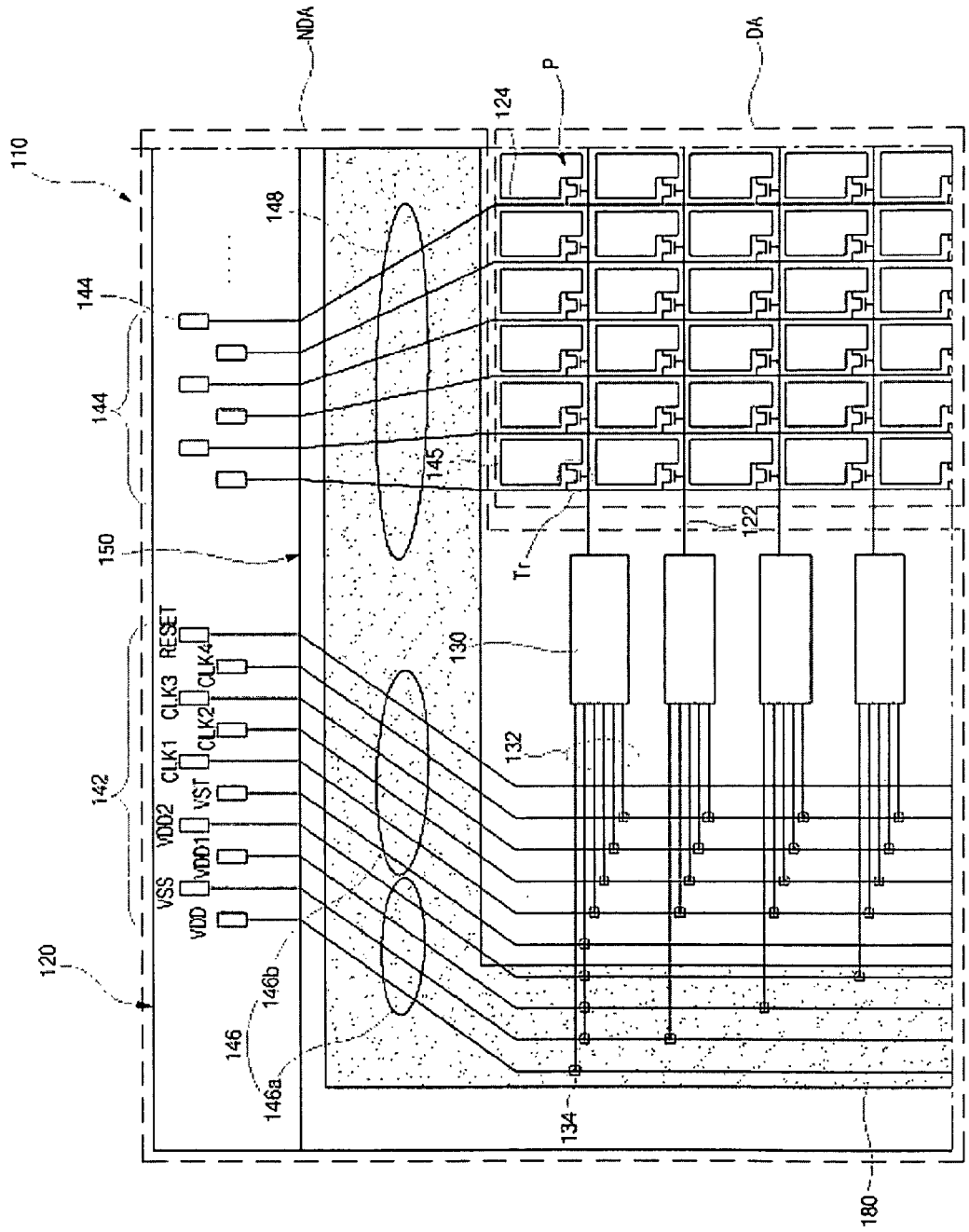
FIG. 4 is a plan view of a GIP type LCD device according to a first embodiment of the invention.
Figure 5:
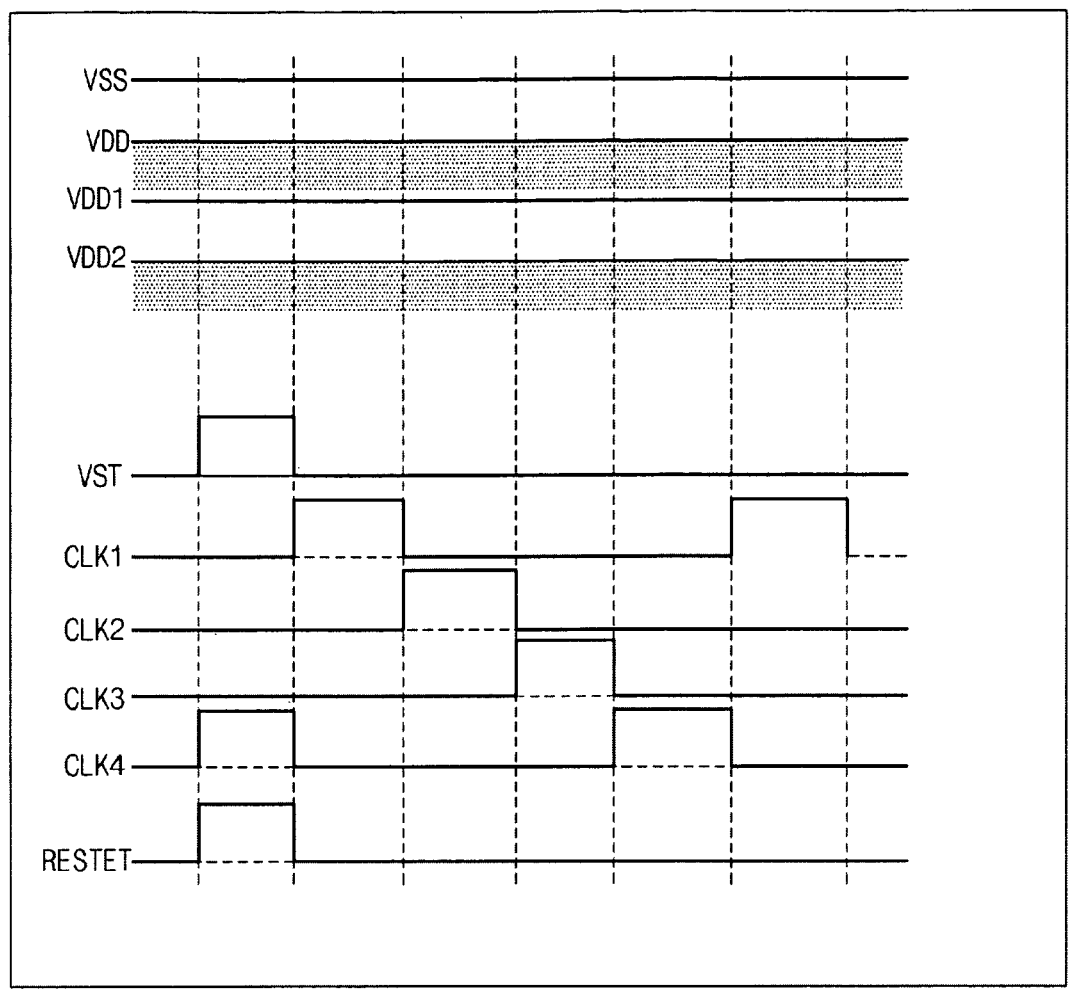
FIG. 5 is a view showing waveforms of gate control signals of a GIP type LCD device according to the first embodiment of the invention.

FIG. 4 is a plan view of a GIP type LCD device according to a first embodiment of the invention, and FIG. 5 is a view showing waveforms of gate control signals of a GIP type LCD device according to the first embodiment of the invention.

In FIG. 4, the GIP type LCD device 110 includes a first substrate 120, a second substrate 150 over the first substrate 120, and a liquid crystal layer (not shown) interposed between the substrates 120 and 150.

The first substrate 120, which may be referred to as an array substrate, includes a display area DA for displaying images and a non-display area NDA for driving circuits and signal lines.

In the display area DA of the first substrate 120, gate lines 122, data lines 124, thin film transistors Tr and pixel electrodes 145 are formed. The gate lines 122 and the data lines 124 cross each other to define pixel regions P. The thin film transistors Tr, as switching elements, are connected to the gate lines 122 and the data lines 124, and the pixel electrodes 145 are connected to the thin film transistors Tr, respectively.

In the non-display area NDA of the first substrate 120, gate pads 142, data pads 144, gate circuit blocks 130, gate link lines 146, data link lines 148 and connection lines 132 are formed. The data pads 144 are formed at one ends of the data link lines 148, which extend from the data lines 124 in the display area DA, and are connected to a driving circuit unit (not shown) of the outside. The gate pads 142 are formed at one ends of the gate link lines 146 and are connected to the driving circuit unit (not shown) of the outside. The gate link lines 146 are connected to the connection lines 132 through connection patterns 134. The connection lines 132 are connected to the gate circuit blocks 130, and the gate circuit blocks 130 are connected to one ends of the gate lines 122 in the display area DA.

Although not shown in the figure, each of the thin film transistors Tr includes a gate electrode of a conductive material, a gate insulating layer of an insulating material, an active layer of a semiconductor material, and source and drain electrodes of a conductive material sequentially formed. A passivation layer of an organic or inorganic insulating material is formed on the thin film transistors Tr. The passivation layer includes drain contact holes exposing the drain electrodes, and the pixel electrodes 145 of a transparent conductive material are connected to the drain electrodes through the drain contact holes.

The gate link lines 146 may be formed of the same material and in the same layer as the gate electrodes of the thin film transistors Tr. The connection lines 132 may be formed of the same material and in the same layer as the source and drain electrodes of the thin film transistors Tr. The connection patterns 134 may be formed of the same material and in the same layer as the pixel electrodes 145.

Although not shown in the figure, a color filter layer is formed on a lower surface of the second substrate 150, and a common electrode is formed on the color filter layer. The color filter layer includes red, green and blue color filters corresponding to the pixel regions P.

The first and second substrates 120 and 150 are attached with the liquid crystal layer therebetween such that the pixel electrodes 145 face the common electrode.

In the LCD device 110, the driving circuit unit of the outside provides gate control signals and data signals to the gate pads 142 and the data pads 144. The gate control signals include a source voltage signal VDD, a ground voltage signal VSS, a first source voltage signal VDD1, a second source voltage signal VDD2, a start signal VST, clock signals CLK1, CLK2, CLK3 and CLK4, and a reset signal RESET. The data signals include image signals corresponding to the pixel regions P.

The gate circuit blocks 130 include shift registers, which are composed of a plurality of shift register stages. The gate circuit blocks 130 receive the gate control signals through the connection lines 132 from the driving circuit unit. The gate circuit blocks 130 generate gate signals, which turn on the thin film transistors Tr, in order and provide the gate signals to the gate lines 122.

Here, referring FIG. 5, the gate control signals are classified into direct current (DC) signals and alternating current (AC) signals. The DC signals include the source voltage signal VDD, the ground voltage signal VSS, the first source voltage signal VDD1 and the second source voltage signal VDD2. The AC signals include the start signal VST and the first, second, third and fourth clock signals CLK1, CLK2, CLK3 and CLK4. According to this, the gate link lines 146 transmitting the gate control signals are divided into first gate link lines 146a for transmitting the DC signals and second gate link lines 146b for transmitting the AC signals. That is, the first gate link lines 146a transmit the DC signals, respectively, and are spaced apart to be neighboring to and parallel to each other. The second gate link lines 146b transmit the AC signals, respectively, and are spaced apart to be neighboring to and parallel to each other.

More particularly, the source voltage signal VDD and the ground voltage signal VSS are DC voltages that are used as sources of the gate circuit blocks 130. The first source voltage signal VDD1 and the second source voltage signal VDD2 are DC voltages that are alternately used to minimize stress of switching elements of the gate circuit blocks 130. The source voltage signal VDD and the second source voltage signal VDD2 are high level voltages, and the ground voltage signal VSS and the first source voltage signal VDD1 are low level voltages. Meanwhile, the start signal VST is an AC voltage that synchronizes at the beginning of each frame and starts operation of the gate circuit blocks 130. The first, second, third and fourth clock signals CLK1, CLK2, CLK3 and CLK4 are AC voltages that are used for generating the gate signals in the gate circuit blocks 130. The reset signal RESET is an AC voltage that is used for reset of the gate circuit blocks 130.

In the first substrate 120 of the LCD device 110, the first gate link lines 146a transmitting the DC signals are arranged to be neighboring to each other and form one group, and the second gate link lines 146b transmitting the AC signals are arranged to be neighboring to each other and form another group.

The first and second substrates 120 and 150 are attached using a seal pattern 180. The seal pattern 180 surrounds the display area DA and is formed in an edge portion of the non-display area NDA. That is, the seal pattern 180 corresponds to an edge portion of the second substrate 150 and is formed in an outer portion of the display area DA such that the seal pattern 180 overlaps the first gate link lines 146a. In other words, in the non-display area NDA of the left side of the LCD device 110 in the context of the figure, the seal pattern 180 covers the first gate link lines 146a that are arranged to be neighboring to each other.

More particularly, the first and second gate link lines 146a and 146b include first parts connected to the connection lines 132 and second parts connected to the gate pads 142, and the seal pattern 180 covers the second parts of the first gate link lines 146a. Here, the first parts of the first and second gate link lines 146a and 146b may be bent. The second parts of the first and second gate link lines 146a and 146b may be parallel to the data lines 124.

Since the seal pattern 180 overlaps the second parts of the first gate link lines 146a, an additional area for the seal pattern 180 can be omitted. Accordingly, the width of the non-display area NDA of the LCD device 110 can be reduced, and a relative ratio of the display area DA of the LCD device can be increased.

Here, there may be a parasitic capacitance due to the seal pattern 180 formed over the second parts of the first gate link lines 146a. However, distortion of the DC signals from rising time delay and falling time delay due to the parasitic capacitance is insignificant. Accordingly, distortion of the DC signals transmitted by the first gate link lines 146a due to the parasitic capacitance is minimized, and misoperation in the gate signals generated by the gate circuit blocks 130 can be prevented.

Figure 6:
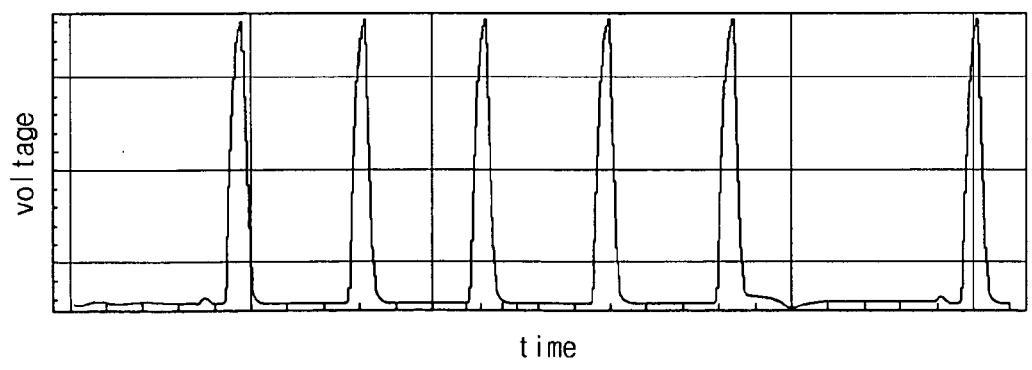
FIG. 6 is a view showing a waveform of a gate signal generated by a gate circuit block of a GIP type LCD device according to the first embodiment of the invention.

FIG. 6 is a view showing a waveform of a gate signal generated by a gate circuit block of a GIP type LCD device according to the first embodiment of the invention. As shown in FIG. 6, in the GIP type LCD device 110 of FIG. 4 according to the first embodiment of the invention, the first gate link lines 146a of FIG. 4 transmitting the DC signals are formed to be neighboring to each other, and the seal pattern 180 of FIG.

4 is formed over the second parts of the first gate link lines 146a. Therefore, distortion of the DC signals is minimized, and the gate circuit block 130 of FIG. 4 generates a normal gate signal without misoperation and provides the gate signal to the gate line 122 of FIG. 4.

Accordingly, a relative ratio of the display area of the LCD device is increased, and the bezel is decreased. The external grade of the LCD device is improved.

Figure 7:
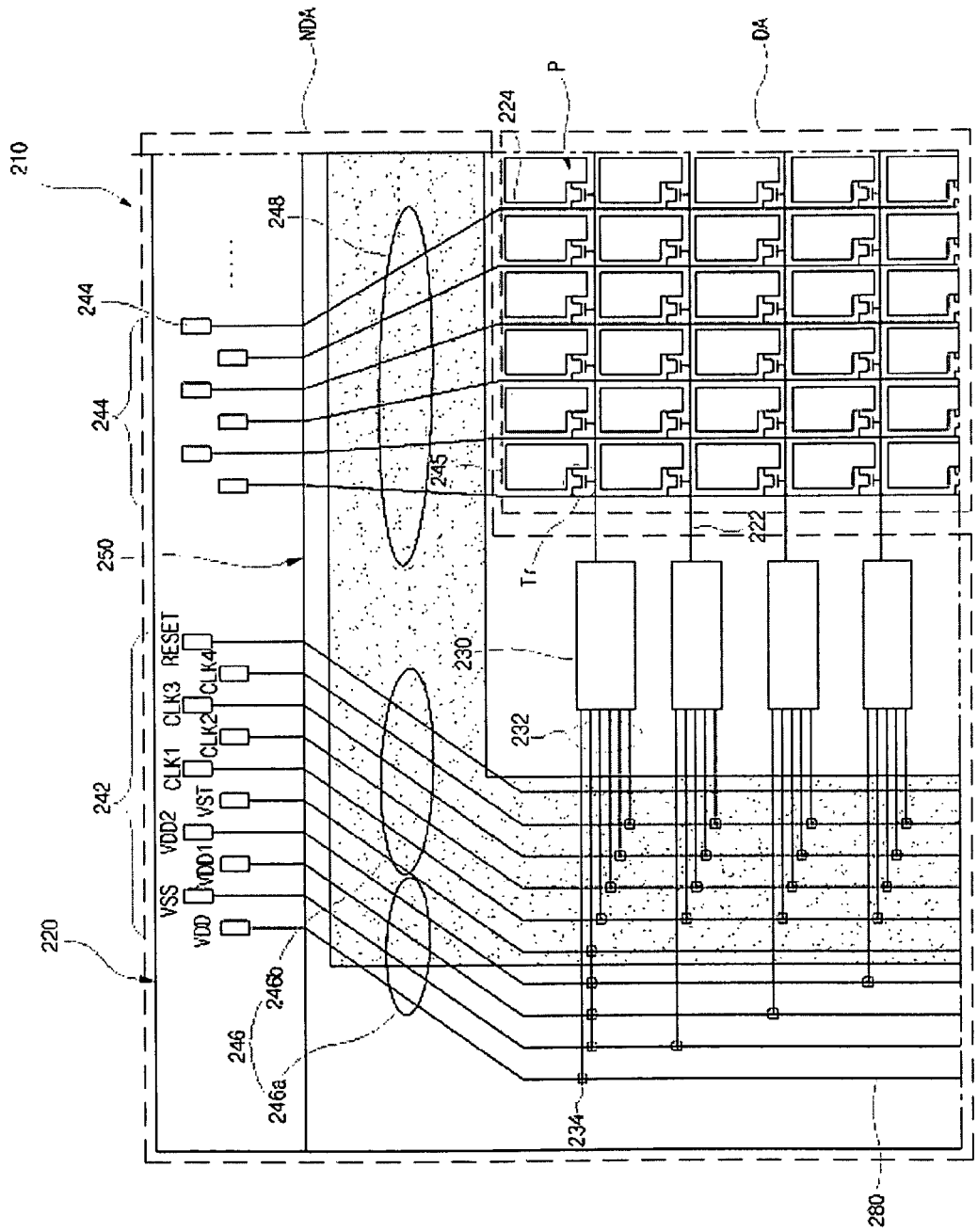
FIG. 7 is a plan view of a GIP type LCD device according to a second embodiment of the invention.

FIG. 7 is a plan view of a GIP type LCD device according to a second embodiment of the invention. In FIG. 7, the GIP type LCD device 210 includes a first substrate 220, a second substrate 250 over the first substrate 220, and a liquid crystal layer (not shown) interposed between the substrates 220 and 250. The first substrate 220, which may be referred to as an array substrate, includes a display area DA for displaying images and a non-display area NDA for driving circuits and signal lines.

In the display area DA of the first substrate 220, gate lines 222, data lines 224, thin film transistors Tr and pixel electrodes 245 are formed. The gate lines 222 and the data lines 224 cross each other to define pixel regions P. The thin film transistors Tr, as switching elements, are connected to the gate lines 222 and the data lines 224, and the pixel electrodes 245 are connected to the thin film transistors Tr, respectively.

In the non-display area NDA of the first substrate 220, gate pads 242, data pads 244, gate circuit blocks 230, gate link lines 246, data link lines 248 and connection lines 232 are formed. The data pads 244 are formed at one ends of the data link lines 248, which extend from the data lines 224 in the display area DA, and are connected to a driving circuit unit (not shown) of the outside. The gate pads 242 are formed at one ends of the gate link lines 246 and are connected to the driving circuit unit (not shown) of the outside. The gate link lines 246 are connected to the connection lines 232 through connection patterns 234. The connection lines 232 are connected to the gate circuit blocks 230, and the gate circuit blocks 230 are connected to one ends of the gate lines 222 in the display area DA.

Although not shown in the figure, each of the thin film transistors Tr includes a gate electrode of a conductive material, a gate insulating layer of an insulating material, an active layer of a semiconductor material, and source and drain electrodes of a conductive material sequentially formed. A passivation layer of an organic or inorganic insulating material is formed on the thin film transistors Tr. The passivation layer includes drain contact holes exposing the drain electrodes, and the pixel electrodes 245 of a transparent conductive material are connected to the drain electrodes through the drain contact holes.

The gate link lines 246 may be formed of the same material and in the same layer as the gate electrodes of the thin film transistors Tr. The connection lines 232 may be formed of the same material and in the same layer as the source and drain electrodes of the thin film transistors Tr. The connection patterns 234 may be formed of the same material and in the same layer as the pixel electrodes 245.

Although not shown in the figure, a color filter layer is formed on a lower surface of the second substrate 250, and a common electrode is formed on the color filter layer. The color filter layer includes red, green and blue color filters corresponding to the pixel regions P.

The first and second substrates 220 and 250 are attached with the liquid crystal layer therebetween such that the pixel electrodes 245 face the common electrode.

In the LCD device 210, the driving circuit unit of the outside provides gate control signals and data signals to the gate pads 242 and the data pads 244. The gate control signals include a source voltage signal VDD, a ground voltage signal VSS, a first source voltage signal VDD1, a second source voltage signal VDD2, a start signal VST, clock signals CLK1, CLK2, CLK3 and CLK4, and a reset signal RESET. The data signals include image signals corresponding to the pixel regions P.

The gate circuit blocks 230 include shift registers, which are composed of a plurality of shift register stages. The gate circuit blocks 230 receive the gate control signals through the connection lines 232 from the driving circuit unit. The gate circuit blocks 230 generate gate signals, which turn on the thin film transistors Tr, in order and provide the gate signals to the gate lines 222.

The gate control signals are classified into direct current (DC) signals and alternating current (AC) signals. The DC signals include the source voltage signal VDD, the ground voltage signal VSS, the first source voltage signal VDD1 and the second source voltage signal VDD2. The AC signals include the start signal VST and the first, second, third and fourth clock signals CLK1, CLK2, CLK3 and CLK4. According to this, the gate link lines 246 transmitting the gate control signals are divided into first gate link lines 246a for transmitting the DC signals and second gate link lines 246b for transmitting the AC signals. That is, the first gate link lines 246a transmit the DC signals, respectively, and are disposed to be neighboring to each other. The second gate link lines 246b transmit the AC signals, respectively, and are disposed to be neighboring to each other.

More particularly, the source voltage signal VDD and the ground voltage signal VSS are DC voltages that are used as sources of the gate circuit blocks 230. The first source voltage signal VDD1 and the second source voltage signal VDD2 are DC voltages that are alternately used to minimize stress of switching elements of the gate circuit blocks 230. The source voltage signal VDD and the second source voltage signal VDD2 are high level voltages, and the ground voltage signal VSS and the first source voltage signal VDD1 are low level voltages. Meanwhile, the start signal VST is an AC voltage that synchronizes at the beginning of each frame and starts operation of the gate circuit blocks 230. The first, second, third and fourth clock signals CLK1, CLK2, CLK3 and CLK4 are AC voltages that are used for generating the gate signals in the gate circuit blocks 230. The reset signal RESET is an AC voltage that is used for reset of the gate circuit blocks 230.

In the first substrate 220 of the LCD device 210, the first gate link lines 246a transmitting the DC signals are arranged to be neighboring to each other and form one group, and the second gate link lines 246b transmitting the AC signals are arranged to be neighboring to each other and form another group.

The first and second substrates 220 and 250 are attached using a seal pattern 280. The seal pattern 280 surrounds the display area DA and is formed in an edge portion of the non-display area NDA. That is, the seal pattern 280 corresponds to an edge portion of the second substrate 250 and is formed in an outer portion of the display area DA such that the seal pattern 280 overlaps the second gate link lines 246b. In other words, in the non-display area NDA of the left side of the LCD device 210 in the context of the figure, the seal pattern 280 covers the second gate link lines 246b that are arranged to be neighboring to each other.

More particularly, the first and second gate link lines 246a and 246b include first parts connected to the connection lines 232 and second parts connected to the gate pads 242, and the seal pattern 280 covers the second parts of the second gate link lines 346b. Here, the first parts of the first and second gate link lines 246a and 246b may be bent. The second parts of the first and second gate link lines 246a and 246b may be parallel to the data lines 224.

Since the seal pattern 280 overlaps the second parts of the second gate link lines 246b, an additional area for the seal pattern 280 can be omitted. Accordingly, the width of the non-display area NDA of the LCD device 210 can be reduced, and a relative ratio of the display area DA of the LCD device can be increased.

Here, there may be a parasitic capacitance due to the seal pattern 280 formed over the second parts of the second gate link lines 246b. However, since all the second gate link lines 246b overlapping the seal pattern 280 transmit AC signals, rising time delay and falling time delay due to the parasitic capacitance are substantially the same at each line. Accordingly, deviation in distortions of the AC signals transmitted by the second gate link lines 246b due to the parasitic capacitance is minimized, and the gate circuit blocks 230 generate the gate signals without misoperation and provide the gate signals to the gate lines 222.

Therefore, a relative ratio of the display area of the LCD device is increased, and the bezel is decreased. The external grade of the LCD device is improved.

Figure 8:
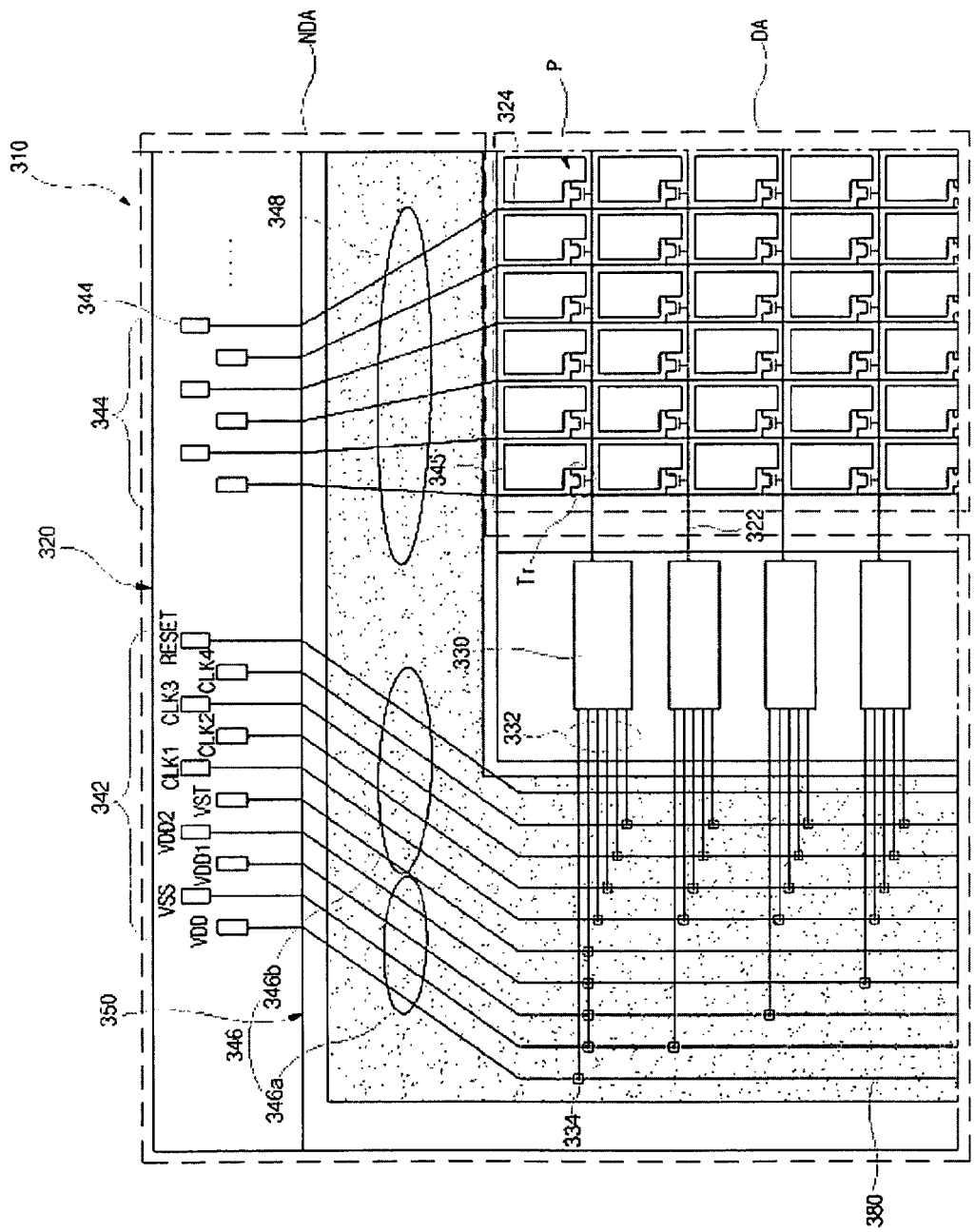
FIG. 8 is a plan view of a GIP type LCD device according to a third embodiment of the invention.

FIG. 8 is a plan view of a GIP type LCD device according to a third embodiment of the invention. In FIG. 8, the GIP type LCD device 310 includes a first substrate 320, a second substrate 2350 over the first substrate 320, and a liquid crystal layer (not shown) interposed between the substrates 320 and 350. The first substrate 320, which may be referred to as an array substrate, includes a display area DA for displaying images and a non-display area NDA for driving circuits and signal lines.

In the display area DA of the first substrate 320, gate lines 2322, data lines 324, thin film transistors Tr and pixel electrodes 345 are formed. The gate lines 322 and the data lines 324 cross each other to define pixel regions P. The thin film transistors Tr, as switching elements, are connected to the gate lines 322 and the data lines 324, and the pixel electrodes 345 are connected to the thin film transistors Tr, respectively.

In the non-display area NDA of the first substrate 320, gate pads 342, data pads 344, gate circuit blocks 330, gate link lines 346, data link lines 348 and connection lines 332 are formed. The data pads 344 are formed at one ends of the data link lines 348, which extend from the data lines 324 in the display area DA, and are connected to a driving circuit unit (not shown) of the outside. The gate pads 342 are formed at one ends of the gate link lines 346 and are connected to the driving circuit unit (not shown) of the outside. The gate link lines 346 are connected to the connection lines 332 through connection patterns 334. The connection lines 332 are connected to the gate circuit blocks 330, and the gate circuit blocks 330 are connected to one ends of the gate lines 322 in the display area DA.

Although not shown in the figure, each of the thin film transistors Tr includes a gate electrode of a conductive material, a gate insulating layer of an insulating material, an active layer of a semiconductor material, and source and drain electrodes of a conductive material sequentially formed. A passivation layer of an organic or inorganic insulating material is formed on the thin film transistors Tr. The passivation layer includes drain contact holes exposing the drain electrodes, and the pixel electrodes 345 of a transparent conductive material are connected to the drain electrodes through the drain contact holes.

The gate link lines 346 may be formed of the same material and in the same layer as the gate electrodes of the thin film transistors Tr. The connection lines 332 may be formed of the same material and in the same layer as the source and drain electrodes of the thin film transistors Tr. The connection patterns 334 may be formed of the same material and in the same layer as the pixel electrodes 345.

Although not shown in the figure, a color filter layer is formed on a lower surface of the second substrate 350, and a common electrode is formed on the color filter layer. The color filter layer includes red, green and blue color filters corresponding to the pixel regions P.

The first and second substrates 320 and 350 are attached with the liquid crystal layer therebetween such that the pixel electrodes 345 face the common electrode.

In the LCD device 310, the driving circuit unit of the outside provides gate control signals and data signals to the gate pads 342 and the data pads 344. The gate control signals include a source voltage signal VDD, a ground voltage signal VSS, a first source voltage signal VDD1, a second source voltage signal VDD2, a start signal VST, clock signals CLK1, CLK2, CLK3 and CLK4, and a reset signal RESET. The data signals include image signals corresponding to the pixel regions P.

The gate circuit blocks 330 include shift registers, which are composed of a plurality of shift register stages. The gate circuit blocks 330 receive the gate control signals through the connection lines 332 from the driving circuit unit. The gate circuit blocks 330 generate gate signals, which turn on the thin film transistors Tr, in order and provide the gate signals to the gate lines 322.

The gate control signals are classified into direct current (DC) signals and alternating current (AC) signals. The DC signals include the source voltage signal VDD, the ground voltage signal VSS, the first source voltage signal VDD1 and the second source voltage signal VDD2. The AC signals include the start signal VST and the first, second, third and fourth clock signals CLK1, CLK2, CLK3 and CLK4. According to this, the gate link lines 346 transmitting the gate control signals are divided into first gate link lines 346a for transmitting the DC signals and second gate link lines 346b for transmitting the AC signals. That is, the first gate link lines 346a transmit the DC signals, respectively, and are disposed to be neighboring to each other. The second gate link lines 346b transmit the AC signals, respectively, and are disposed to be neighboring to each other.

More particularly, the source voltage signal VDD and the ground voltage signal VSS are DC voltages that are used as sources of the gate circuit blocks 330. The first source voltage signal VDD1 and the second source voltage signal VDD2 are DC voltages that are alternately used to minimize stress of switching elements of the gate circuit blocks 330. The source voltage signal VDD and the second source voltage signal VDD2 are high level voltages, and the ground voltage signal VSS and the first source voltage signal VDD1 are low level voltages. Meanwhile, the start signal VST is an AC voltage that synchronizes at the beginning of each frame and starts operation of the gate circuit blocks 330. The first, second, third and fourth clock signals CLK1, CLK2, CLK3 and CLK4 are AC voltages that are used for generating the gate signals in the gate circuit blocks 330. The reset signal RESET is an AC voltage that is used for reset of the gate circuit blocks 330.

In the first substrate 320 of the LCD device 310, the first gate link lines 346a transmitting the DC signals are arranged to be neighboring to each other and form one group, and the second gate link lines 346b transmitting the AC signals are arranged to be neighboring to each other and form another group.

The first and second substrates 320 and 350 are attached using a seal pattern 380. The seal pattern 380 surrounds the display area DA and is formed in an edge portion of the non-display area NDA. That is, the seal pattern 380 corresponds to an edge portion of the second substrate 350 and is formed in an outer portion of the display area DA such that the seal pattern 380 overlaps the first gate link lines 346a for transmitting the DC signals and the second gate link lines 346b for transmitting the AC signals. In other words, in the non-display area NDA of the left side of the LCD device 310 in the context of the figure, the seal pattern 380 covers the first gate link lines 346a and the second gate link lines 346b that are arranged to be neighboring to each other.

More particularly, the first and second gate link lines 346a and 346b include first parts connected to the connection lines 332 and second parts connected to the gate pads 342, and the seal pattern 380 covers the second parts of the first and second gate link lines 346a and 346b. Here, the first parts of the first and second gate link lines 346a and 346b may be bent. The second parts of the first and second gate link lines 346a and 346b may be parallel to the data lines 324.

Since the seal pattern 380 overlaps the second parts of the first gate link lines 346a and the second gate link lines 346b, an additional area for the seal pattern 380 can be omitted. Accordingly, the width of the non-display area NDA of the LCD device 310 can be reduced, and a relative ratio of the display area DA of the LCD device can be increased. In addition, the seal pattern 380 covers the second parts of the first gate link lines 346a and the second gate link lines 346b, and thus the seal pattern 380 has an enough thickness to increase attachment of the first and second substrates 320 and 380.

Here, there may be a parasitic capacitance due to the seal pattern 380 formed over the second parts of the first gate link lines 346a and the second gate link lines 346b. However, the DC signals transmitted by the first gate link lines 346a are insignificantly distorted due to the parasitic capacitance, and the AC signals transmitted by the second gate link lines 346b are distorted with minimum deviation due to the parasitic capacitance because the second gate link lines 346b are neighboring to each other. As a result, the gate circuit blocks 330 generate the gate signals without misoperation and provide the gate signals to the gate lines 322.

Accordingly, a relative ratio of the display area of the LCD device is increased, and the bezel is decreased. The external grade of the LCD device is improved.

According to an embodiment of the invention, the first gate link lines transmitting the DC signals in the GIP type LCD device are disposed to be adjacent to and parallel to each other, and the second gate link lines transmitting the AC signals are disposed to be adjacent to and parallel to each other. The first and second gate link lines include the first parts connected to the gate pads and second parts connected to the connection lines. The seal pattern overlaps the second parts of the first gate link line and/or the second gate link lines. Therefore, an additional area for the seal pattern can be omitted, and signal distortion and deviation of signal distortion due to the parasitic capacitance can be minimized to thereby provide normal gate signals.

It will be apparent to those skilled in the art that various modifications and variations can be made in the fabrication and application of the embodiments without departing from the spirit or scope of the invention. Thus, it is intended that the invention cover the modifications and variations of the embodiments provided they come within the scope of the appended claims and their equivalents.

What is claimed is:

1. A gate-in-panel type liquid crystal display device, comprising:
    first and second substrates spaced apart from and facing each other, the first and second substrates including a display area and a non-display area;
    gate lines, data lines, thin film transistors and pixel electrodes in the display area on the first substrate, the gate lines and the data lines crossing each other to define pixel regions, the thin film transistors connected to the gate lines and the data lines, the pixel electrodes connected to the thin film transistors;
    gate pads and data pads in the non-display area on the first substrate, the gate pads and the data pads receiving DC signals and AC signals;
    gate link lines connected to the gate pads and including first gate link lines and second gate link lines, the first gate link lines transmitting the DC signals and disposed to be adjacent to and parallel to each other, the second gate link lines transmitting the AC signals and disposed to be adjacent to and parallel to each other;
    connection lines connected to the gate link lines;
    gate circuit blocks connected to the connection lines, the gate circuit blocks generating gate signals using the DC signals and the AC signals and providing the gate signals to the gate lines; and
    a seal pattern between the first and second substrates, the seal pattern overlapping the gate link lines.

2. The device according to claim 1, wherein the seal pattern overlaps the first gate link lines and exposes the second gate link lines.

3. The device according to claim 1, wherein the seal pattern overlaps the second gate link lines and exposes the first gate link lines.

4. The device according to claim 1, wherein the seal pattern overlaps the first gate link lines and the second gate link lines.

5. The device according to claim 1, wherein the gate circuit blocks are shift registers including shift register stages.

6. The device according to claim 1, wherein the DC signals include a source voltage signal VDD, a ground voltage signal VSS, a first source voltage signal VDD1 and a second source voltage signal VDD2 of the gate circuit blocks.

7. The device according to claim 1, wherein the AC signals include a start signal VST, first, second, third and fourth clock signals CLK1, CLK2, CLK3 and CLK4, and a reset signal RESET of the gate circuit blocks.

8. The device according to claim 1, further comprising data link lines connecting the data lines and the data pads.

9. The device according to claim 1, wherein the gate link lines have first parts connected to the gate pads and second parts connected to the connection lines, and the seal pattern overlaps the second parts of the gate link lines.

10. A method of manufacturing a gate-in-panel type liquid crystal display device, comprising:
    forming gate lines, data lines, thin film transistors and pixel electrodes in a display area on a first substrate, the gate lines and the data lines crossing each other to pixel regions, the thin film transistors connected to the gate lines and the data lines, the pixel electrodes connected to the thin film transistors;
    forming gate pads and data pads in a non-display area on the first substrate, the gate pads and the data pads receiving DC signals and AC signals;
    forming gate link lines in the non-display area on the first substrate, the gate link lines connected to the gate pads and including first gate link lines and second gate link lines, the first gate link lines transmitting the DC signals and disposed to be adjacent to and parallel to each other, the second gate link lines transmitting the AC signals and disposed to be adjacent to and parallel to each other;

forming connection lines connected to the gate link lines;

forming gate circuit blocks connected to the connection lines, the gate circuit blocks generating gate signals using the DC signals and the AC signals and providing the gate signals to the gate lines; and attaching the first substrate with a second substrate using a seal pattern such that the seal pattern overlaps the gate link lines.

11. The method according to claim 10, wherein the seal pattern overlaps the first gate link lines and exposes the second gate link lines.

12. The method according to claim 10, wherein the seal pattern overlaps the second gate link lines and exposes the first gate link lines.

13. The method according to claim 10, wherein the seal pattern overlaps the first gate link lines and the second gate link lines.

14. The method according to claim 10, wherein the gate link lines have first parts connected to the gate pads and second parts connected to the connection lines, and the seal pattern overlaps the second parts of the gate link lines.

* * * * *